United States Patent [19]

Bufler

[11] 4,061,362
[45] Dec. 6, 1977

[54] REAR AXLE STABILIZER

[75] Inventor: Ernst Bufler, Wolfsburg, Germany

[73] Assignee: Volkswagenwerk Aktiengesellschaft, Germany

[21] Appl. No.: 686,009

[22] Filed: May 13, 1976

[30] Foreign Application Priority Data

May 24, 1975 Germany ............................. 2523121

[51] Int. Cl.² ...................... B60G 11/00; B60G 21/00
[52] U.S. Cl. .................................. 280/689; 267/11 R
[58] Field of Search ............... 280/689, 700, 721, 723; 267/11, 57

[56] References Cited

U.S. PATENT DOCUMENTS

| 3,448,994 | 6/1969 | King ....................................... 280/689 |
| 3,885,775 | 5/1975 | Bolduc .................................. 280/689 |

FOREIGN PATENT DOCUMENTS

| 1,046,128 | 7/1953 | France. |
| 852,499 | 10/1939 | France. |

Primary Examiner—Philip Goodman
Attorney, Agent, or Firm—Brumbaugh, Graves, Donohue & Raymond

[57] ABSTRACT

A rear axle roll stabilizer is pivotably mounted between a vehicle chassis and the rear axle in a manner which provides a decrease in roll restoring moment as the load on the vehicle is increased.

3 Claims, 6 Drawing Figures

REAR AXLE STABILIZER

BACKGROUND OF THE INVENTION

This invention relates to stabilizers for the rear axle of a vehicle and in particular to such stabilizers as are designed to provide uniform vehicle self-steering tendencies over a wide range of vehicle loads.

Increased loading on a motor vehicle, particularly one equipped with a front mounted engine, tends to be distributed more on the rear axle of the vehicle than on the front axle. There is consequently a large change in the vehicle load forces on the rear wheels compared to those on the front wheels. As a result of this differential change in wheel loading, there is, when the vehicle negotiates a curve, a large increase in the skew angle of the rear wheels, or of the rear axle respectively, and only a small increase in the skew angle of the front wheels, or of the front axle respectively, because the skew angle depends, as is well known, on the load forces on the wheels. Skew angle is the angle between the plane of the wheel and the direction of the wheel travel. It is also well known that the self-steering characteristic of a vehicle depends on the difference between the skew angle of the rear axle and the skew angle of the front axle. Accordingly, a change of the self-steering characteristic takes place when the vehicle is loaded. A vehicle with a neutral self-steering characteristic when empty becomes over-steering when loaded. Similar changes occur in a vehicle which is under-steering when empty, in that it tends to become neutral or even over-steering when loaded. Such changes in self-steering tendency are naturally undesired.

In order to avoid load dependent changes in self-steering tendency it is desirable to provide a stabilizer for correcting the changes in skew angle. This may be achieved by adjusting the roll restoring moment exerted by the suspension between the rear axle and the chassis in such a manner it decreases with increasing vehicle load.

In doing so the change in rear wheel loading of the fully loaded vehicle (increased load on the curve outer wheel and decreased load on the curve inner wheel) when negotiating a curve will be smaller with respect to conventionally stabilized vehicles and consequently there will be a smaller skew angle of the rear axle. If the rolling restoring moment on the rear axle is decreased with increasing vehicle load, the roll angle of the vehicle will also increase and consequently there will be exerted a greater roll restoring moment on the front axle so that the skew angle of the front axle will increase with respect to conventionally stabilized vehicles. This decrease of the skew angle of the rear axle and the simultaneous increase of the skew angle of the front axle with increasing vehicle load reduces the tendency of over-steering of the fully loaded vehicle and makes the self-steering characteristics substantially load independent.

OBJECTS OF THE PRESENT INVENTION

It is therefore an object of the present invention to provide a stabilizer for the rear axle of a motor vehicle which renders the self-steering characteristics of the vehicle independent of vehicle load.

It is a further object of the present invention to provide such a stabilizer between the rear axle and the chassis which provides decreased roll restoring moment between the rear axle and the chassis with increased vehicle load.

SUMMARY OF THE INVENTION

In accordance with the present invention there is provided a stabilizer for mounting between the rear axle and the chassis of a motor vehicle. The stabilizer includes a U-shaped stabilizer bar which is pivotably mounted by its midsection and arms between the chassis and the axle in an arrangement which provides roll restoring moments between the rear axle and the chassis which decrease with increasing vehicle load.

In accordance with a preferred embodiment of the present invention, the stabilizer includes tie rods, pivotably mounted to the arms of the stabilizer bar, and the stabilizer bar is mounted between the chassis and the axle by its midsection and by the tie rods. The stabilizer is preferably arranged so that the angle between the tie rods and the arms of the stabilizer bar, in a plane perpendicular to the rear axle, is approximately 90° when the vehicle is fully loaded and is considerably greater than 90° when the vehicle is unloaded. The tie rods may be inclined inwardly toward a virtual point of intersection above the rods. In one arrangement the stabilizer bar is mounted such that the arms of the stabilizer bar are approximately horizontal when the vehicle is fully loaded.

For a better understanding of the present invention, together with other and further objects, reference is had to the following description, taken in conjunction with the accompanying drawings, and its scope will be pointed out in the appended claims.

DESCRIPTION OF THE INVENTION

Figure 1:
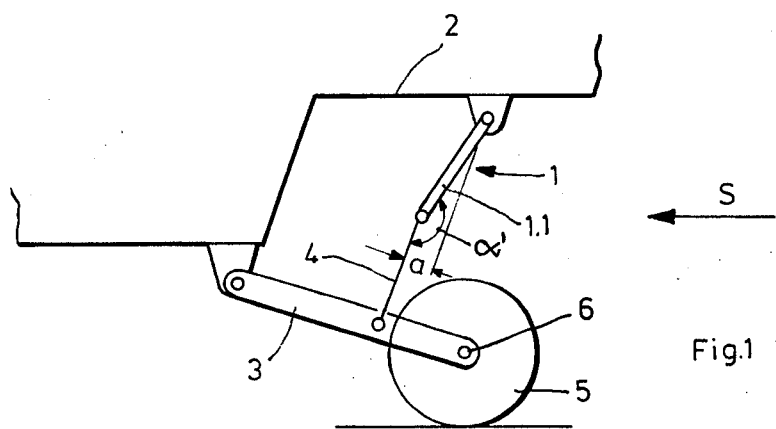
FIG. 1 is a side view of the rear axle of a vehicle having a stabilizer, in accordance with the present invention, on a vehicle which is substantially unloaded.
Figure 2:
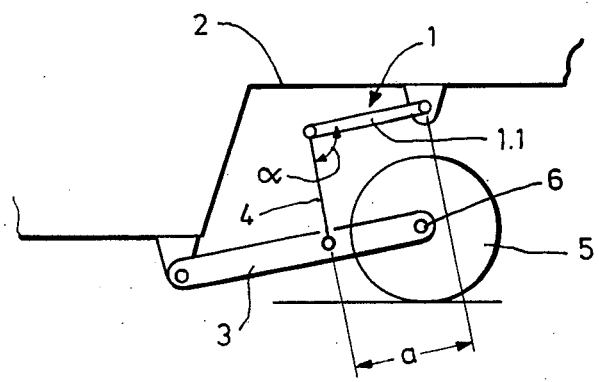
FIG. 2 shows the arrangement of FIG. 1 when the vehicle is fully loaded.

FIGS. 1 and 2 show the rear axle portion of a vehicle having a stabilizer in accordance with the present invention. The rear wheels 5 are mounted on an axle 6 which is connected to vehicle chassis 2 by wheel guiding member 3. Wheel guiding member 3 is conventionally mounted to chassis 2 so that it may pivot in accordance with the vehicle load. The pivot angle of wheel guiding member 3 is determined by a rear wheel spring which is not explicitly shown in FIGS. 1 or 2. FIG. 1 illustrates the position of the rear axle with respect to the chassis when the vehicle is unloaded and FIG. 2 illustrates the position of the rear axle with respect to the chassis when the vehicle is loaded. In addition to the axle, wheel guiding members, springs and other conventional suspension devices, such as schock absorbers, there is provided in the illustration a stabilizer bar 1 which is mounted to wheel guiding member 3 by a tie rod 4. Stabilizer 1 is of a U-shaped configuration and in the FIGS. 1 and 2 embodiments is pivotably mounted to the chassis of the vehicle by its mid-section. The arms 1.1 of stabilizer 1 are pivotably mounted to wheel guiding member 3. Arrow S in FIG. 1 indicates the direction of vehicle travel in a forward direction.

As illustrated in FIG. 1, when the vehicle is assembled and unloaded the arms 1.1 of stabilizer 1 form an angle $\alpha'$ with tie rods 4. Angle $\alpha'$ is greater than 135°. By reason of the large angle, forces of roll exerted on stabilizer 1 by tie rod 4 have a rather small leverage indicated by $a$. FIG. 2 illustrates the stabilizer when the vehicle is fully loaded. In this case the normal displacement of wheel guiding member 3 against the rear suspension springs of the vehicle causes a deflection of the stabilizer bar 1 to a point where the arms 1.1 of stabilizer bar 1 form an angle of approximately 90° with tie rod 4. In this case the forces exerted by tie rod 4 against stabilizer 1 have a rather large leverage indicated by $a$ in FIG. 2.

When the vehicle, equipped with the stabilizer is unloaded as illustrated in FIG. 1 and negotiates a turn, roll forces exerted by rear axle 6 and wheel guiding members 3 on tie rod 4 tend to deflect the arms of U-shaped stabilizer 1 from their normal parallel position. A torsion is therefore applied to the U-shaped stabilizer. Since, for the unloaded vehicle illustrated in FIG. 1, the leverage of the forces applied by tie rod 4 to stabilizer arms 1.1 is rather small, the stabilizer bar tends to strongly resist the torsion-like roll forces and the chassis therefore has a rather stiff roll characteristic with respect to the rear axle.

When the vehicle is loaded and the stabilizer 1 has the position with respect to tie rod 4 illustrated in FIG. 2, the leverage of the forces applied by tie rod 4 to stabilizer arm 1.1 is rather great, so that the stabilizer bar tends only to softly resist the torsion-like roll forces and the chassis therefore has a rather soft roll characteristic with respect to the rear axle.

The roll restoring moment on the rear axle of an unloaded vehicle equipped with the stabilizer is rather great, and it should be approximately as great as that of a conventionally stabilized vehicle. On the other hand the roll restoring moment on the rear axle of the fully loaded vehicle is considerably smaller than that of a conventional vehicle. Consequently the change in rear wheel loading of the fully loaded vehicle when negotiating a curve is smaller and so it is the skew angle.

Because of this smaller roll restoring moment of the rear axle, there is at the same time an increase in the angular movement of chassis 2, causing increased rolling forces to be applied to the front axle so that the skew angle of the front axle is greater than that of a conventional vehicle.

This smaller skew angle of the rear axle and this greater skew angle of the front axle of the fully loaded vehicle — with respect to a conventionally stabilized vehicle — causes the former usual tendency in oversteering of the fully loaded vehicle to decrease or even to be prevented. Thus the self-steering characteristics of the vehicle become substantially independent of load.

Figure 3:
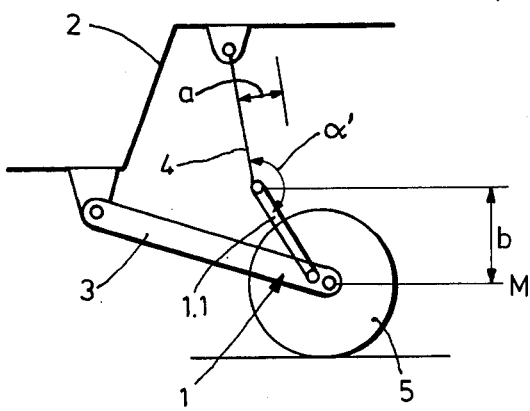
FIG. 3 shows an alternate arrangement of a stabilizer in accordance with the present invention mounted on an unloaded vehicle.
Figure 4:
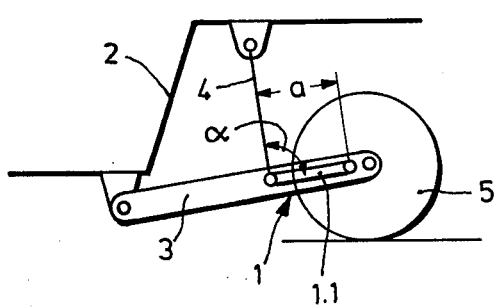
FIG. 4 shows the arrangement of FIG. 3 when the vehicle is fully loaded.

An alternate arrangement for a stabilizer in accordance with the present invention is shown in FIGS. 3 and 4. FIG. 3 is a stabilizer in a vehicle which is unloaded and FIG. 4 is the same stabilizer in a vehicle which is fully loaded. In the embodiment illustrated by FIGS. 3 and 4, the U-shaped stabilizer bar 1 is mounted to the rear axle and the tie rods are connected to the chassis of the vehicle. The arrangement is similar to that shown in FIGS. 1 and 2 since the angle between the arms 1.1 of the stabilizer bar 1 and tie rod 4 is greater than 135° when the vehicle is empty but fully assembled, as illustrated in FIG. 3, resulting in a rather small moment $a$ for forces between the tie rod and the stabilizer. The angle is approximately 90° in the loaded condition, as illustrated in FIG. 4, resulting in a rather large moment $a$. The embodiment of FIGS. 3 and 4 operates substantially the same as the embodiment of FIGS. 1 and 2, since the roll restoring moment supplied by the stabilizer bar 1 are considerably greater when the vehicle is unloaded than when the vehicle is fully loaded.

Figure 5:
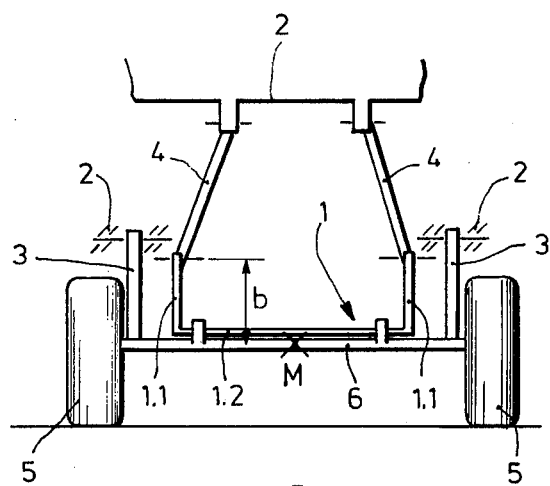
FIG. 5 is a rear view of the FIG. 3 rear axle and stabilizer configuration.

In the embodiment illustrated in FIGS. 1 – 4, tie rods 4 are arranged approximately parallel to each other and pivot in a plane which is substantially vertical and parallel to the longitudinal axis of the vehicle. Illustrated in FIG. 5 is an embodiment of the invention in which the tie rods 4 are inclined inwardly transverse to the longitudinal axis of the vehicle. The tie rods 4 are inclined toward a virtual point of intersection above the tie rods. In the embodiment of FIG. 5, the stabilizer bar 1 and tie rods 4 are arranged so that when the vehicle is fully loaded the arms 1.1 of the stabilizer bar are approximately parallel to the vehicle roadway as illustrated in FIG. 4. When the vehicle is unloaded, as illustrated in FIG. 5, there is a moment arm $b$ between the instantaneous pole M of the rear axle and the point of interconnection between tie rods 4 and stabilizers 1.1. The moment arm $b$ between the instantaneous pole of M the rear axle and connecting point to the tie rod tends to cause tie rods 4 to swing laterally with respect to the vehicle in response to rolling forces. This tendency tends to increase the roll restoring moment of the suspension when the vehicle is empty. At full load the deflection of the chassis springs causes arms 1.1 to pivot so that they are approximately parallel to the roadway and the intersection between stabilizer arms 1.1 and tie rod 4 is approximately the same height as the pole M of the rear axle. Consequently, the lateral forces on tie rod 4 are eliminated at full vehicle load and there is no lateral swing of tie rods 4.

In the arrangement of FIGS. 1-5, the rear axle is articulated from the chassis 2 by wheel guiding members 3. Wheel guiding members 3 are interconnected by a flexurally rigid but torsionally soft rear axle traverse 6. This relatively simple axle arrangement combines the advantages of single wheel suspension with that of a rigid rear axle. While the stabilizer of the present invention has been described for use in connection with this type of rear axle mounting arrangement, it need not be limited to axles of this type. Those skilled in the art will recognize that the present invention may be used in connection with longitudinal, oblique, transverse or rigid axle guidance arrangements.

Figure 6:
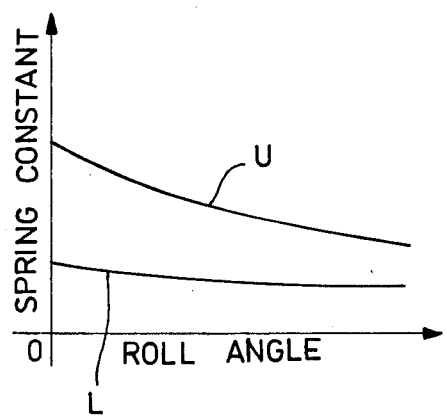
FIG. 6 is a graph indicating the spring constant of roll restoring moment as a function of vehicle roll angle, for a loaded and unloaded vehicle, having a stabilizer in accordance with the present invention.

The graph in FIG. 6 illustrates the spring constant of the stabilizer bar in accordance with the present invention as a function of vehicle roll angle for both the loaded (L) and unloaded (U) vehicle. It should be noted that in accordance with the present invention, the spring constant is considerably greater for the unloaded vehicle and decreases with increasing roll angle. The decrease with increasing roll angle, especially in the unloaded case is attributable to the increased leverage of the tie rod on the stabilizer bar when the chassis of the vehicle rolls with respect to the rear axle. The spring constant for the loaded vehicle is considerably less than for the unloaded vehicle and because the angle between the tie rod and the stabilizer bar is approximately 90° this spring constant is approximately uniform with roll angle.

While there have been described what are believed to be the preferred embodiments of the present invention, those skilled in the art will recognize that other and further modifications may be had thereto without departing from the spirit of the invention, and it is intended to claim all such embodiments as fall within the true scope of the invention.

I claim:

1. A stabilizer for use in conjunction with the rear axle of a vehicle having a chassis, wherein said axle is flexibly mounted to said chassis, comprising a U-shaped stabilizer bar, having a midsection and two arms, and tie rods pivotally mounted to each of said arms, said stabilizer being pivotally mounted between said chassis and said axle by said tie rods and said midsection, said stabilizer having selected dimensions and mounting locations to form an angle between said tie rods and said arms, measured in a plane perpendicular to said axle, of approximately 90° when said vehicle is assembled and fully loaded, resulting in a first leverage for converting rolling forces of said vehicle into torsion forces on said stabilizer bar, and causing said stabilizer bar to exert a first roll-restoring moment between said chassis and said axle, said angle increasing to more than 135° when said vehicle is unloaded but fully assembled, resulting in a second and lower leverage for converting said rolling forces into torsion forces on said stabilizer bar, and causing said stabilizer bar to exert a second and greater roll restoring moment between said chassis and said axle.

2. A stabilizer in accordance with claim 1 wherein said tie rods are inwardly inclined toward a virtual point of intersection above said tie rods.

3. A stabilizer in accordance with claim 2 wherein said stabilizer bar is mounted such that the arms of said stabilizer bar are approximately horizontal when said vehicle is fully loaded.

* * * * *